Figure 1:
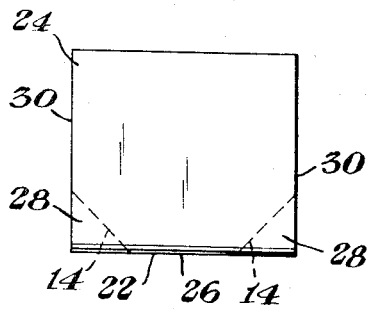

April 12, 1966  A. R. MASON  3,245,407
DISPOSABLE ARTICLES
Filed Jan. 17, 1962  2 Sheets-Sheet 1

INVENTOR.
Albert R. Mason
BY
*Lloyd E. Herrenough*
ATTORNEY

April 12, 1966 A. R. MASON 3,245,407
DISPOSABLE ARTICLES
Filed Jan. 17, 1962 2 Sheets-Sheet 2

INVENTOR.
Albert R. Mason
BY Lloyd E. Hausmann Jr.
ATTORNEY

United States Patent Office 3,245,407
Patented Apr. 12, 1966

3,245,407
DISPOSABLE ARTICLES
Albert R. Mason, Midland, Mich., assignor to The Dow Chemical Company, Midland, Mich., a corporation of Delaware
Filed Jan. 17, 1962, Ser. No. 166,761
3 Claims. (Cl. 128—284)

This invention relates generally to disposable articles and methods of making same and, more particularly, to plastic articles with integral stretch bands and to the process used in the forming thereof.

Prior to the present invention it has been necessary to, in some manner, attach elastic, generally of a rubber or synthetic rubber type, to articles. As can be readily understood this necessitates first forming the articles, forming the elastic, and then by separate operation securing the elastic to the article. Cost-wise, the expense of performing the above separate steps is reasonably justified in non-disposable articles, but is unduly burdensome in those articles which are to be disposed of after being used only once or twice. Prior to the present invention it was necessary to perform all of the above steps whether the article was disposable or of a more lasting character.

Accordingly, it is an object of the present invention to provide for novel disposable articles.

It is another object of the present invention to provide for efficient and relatively inexpensive disposable articles.

It is still another object of the present invention to eliminate the necessity of adding separate elastic rubbers and the like to certain articles to accomplish desired results.

A further object of the present invention is to provide articles having stretch bands integral therewith.

It is still another object of the present invention to utilize the resilient tendencies of certain plastics as stretch bands in articles of apparel and the like.

Still another object of the present invention is to provide a novel method of making disposable articles of apparel and the like.

A still further object of the present invention is to provide a novel method of developing a high degree of elasticity in certain thermoplastic materials.

Another object of the present invention is to provide for a novel method of making articles having integral stretch bands.

Still another object of the present invention is to provide tape having high elastic qualities and being entirely made of plastic.

A further object of the present invention is to provide for a plurality of novel uses of specially treated thermoplastic materials in articles of apparel and the like.

Briefly then, it has been discovered that by specially spot-treating certain thermoplastic materials a highly elastic condition can be created in that material whereby it is possible to make plastic articles including integral stretch bands, where necessary. Generally it is the process to first form the special thermoplastic material into the article which is desired and then locally treat it to shrink the thermoplastic in the area so treated. This area will have an elastic memory and act as though a piece of rubber was connected therein. Thus, if an elastic band is desired to be secured entirely around the article, the special treatment need only be carried on in a narrow band, partially or wholly around the article. Accordingly, by this discovery novel articles can be rather inexpensively made so as to justify disposal thereof after a short period of use.

Figure 2:
Figure 3:
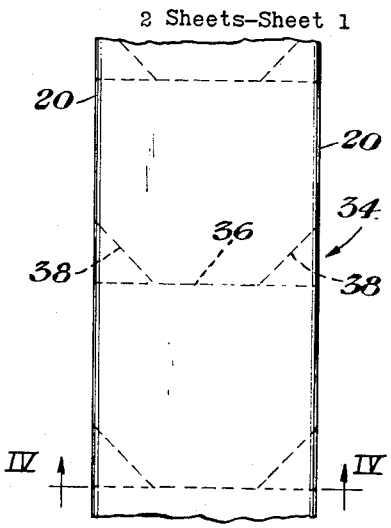
Figure 5:
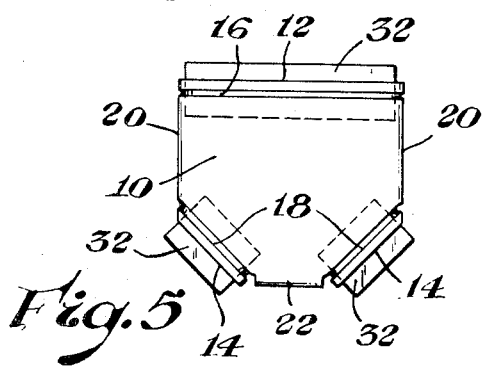
Figure 4:
Figure 6:
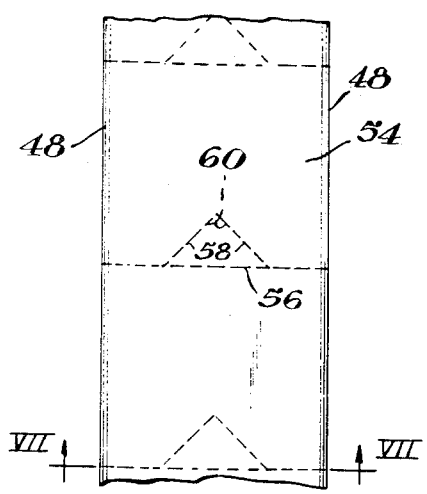
Figure 8:
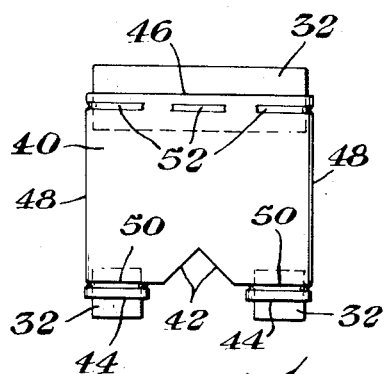
Figure 7:
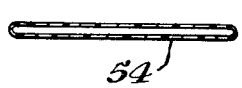
Figure 9:
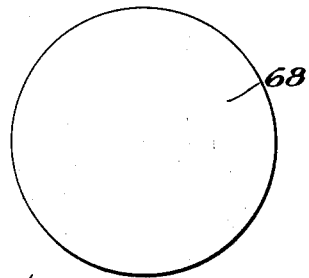
Figure 14:
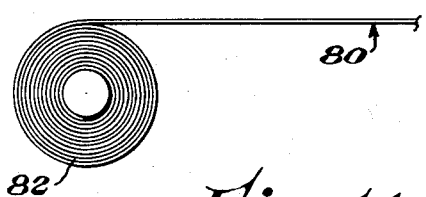
Figure 10:
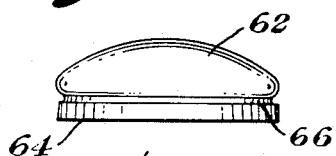
Figure 15:
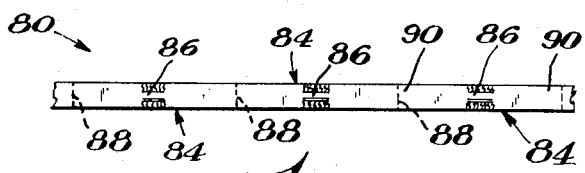
Figure 16:
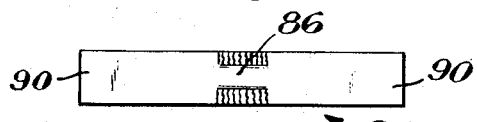
Figure 11:
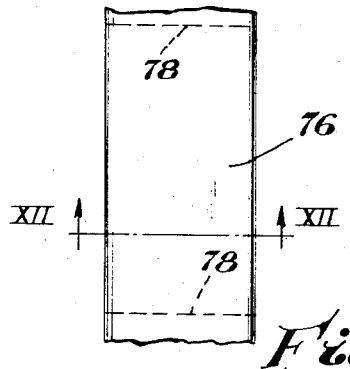
Figure 12:
Figure 17:
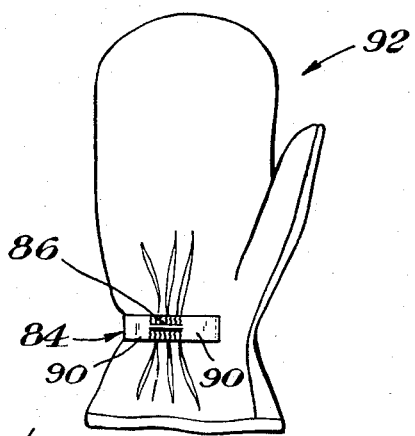
Figure 13:
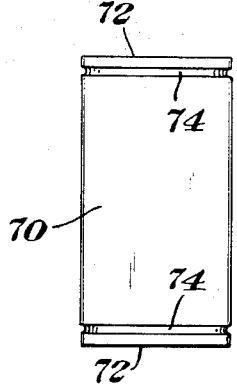

Yet additional objects and advantages of the present invention, and its numerous cognate benefits and features, are even more apparent and manifest in and by the ensuing description and specification, taken in conjunction with accompanying drawing in which, wheresoever possible, like characters of reference designate corresponding materials and parts throughout the several views thereof, and wherein:

FIGURE 1 is a plan view of an article blank;
FIGURE 2 is a side view of FIGURE 1;
FIGURE 3 is a plan view of a progressive strip blank for an article;
FIGURE 4 is a cross-sectional view through the blank of FIGURE 3 taken along the reference line IV—IV thereof;
FIGURE 5 is a front view of an article made from the blanks of either FIGURE 1 or FIGURE 3;
FIGURE 6 is a plan view of a progressive strip blank for another article;
FIGURE 7 is a cross-sectional view through the blank of FIGURE 6 taken along the reference line VII—VII thereof;
FIGURE 8 is a front view of an article made from the blank of FIGURE 6;
FIGURE 9 is a cut-out blank for still another article;
FIGURE 10 is a front view of an article made from the blank of FIGURE 9.
FIGURE 11 is a plan view of a progressive strip blank for yet another article;
FIGURE 12 is a cross-sectional view through the blank of FIGURE 11 taken along reference line XII—XII thereof;
FIGURE 13 is a front view of an article made from the blank of FIGURE 11;
FIGURE 14 is a side view of a cylinder of tape made according to the principles of the present invention;
FIGURE 15 is a partial top plan view of the tape of FIGURE 14;
FIGURE 16 is an enlarged view of a section of the tape of FIGURES 14 and 15;
FIGURE 17 is a front view of an article including the section of tape illustrated in FIGURE 16.

It has been found that certain thermoplastic materials, when specially treated or conditioned, can obtain a high degree of elasticity nearly approaching that of natural and synthetic commercial rubber. It has also been found that such materials can be so treated only at certain parts thereof to give spot elasticity if so desired. Thus, a specified quantity of such material, such as a sheet, can be area conditioned so as to make that area highly elastic while the rest thereof remains relatively inelastic.

It is generally characteristic of adaptable thermoplastics in their pretreated condition that they be able to be formed into a heat shrinkable material, have at least some small amount of rubbery or elastic quality in their natural or unoriented state, and have adequate strength which can be substantially increased by orientation, or irradiation, or by both. Some thermoplastic materials having these characteristics are described in detail in British Patents 866,819, 866,820, 866,821, and 866,822, all issued to W. R. Grace & Company, bearing a complete specification published date of May 3, 1961. Generally, these patents relate to the forming of polyolefin films having the required heat shrink properties. It is a noted characteristic of such films that as the amount of orientation increases therein so does their ability to become elastic increase when specially treated according to the principles of the present invention.

To increase the amount of orientation, irradiation is extremely beneficial particularly when dealing with homopolyethylenes and the like, as suggested in aforementioned British Patent 866,820. Another patent to W. R. Grace & Company, Belgian Patent 575,277, dated February 7, 1958, also relates to a process for establishing a substantially increased amount of orientation in certain thermoplastics by an irradiation process. For example, the process as outlined in the Belgian patent for so treating polyethylene generally comprises irradiating the film with a dose of at least $2 \times 10^6$ REP, heating the irradiated material, biaxially orienting the irradiated material when in the heated state, and then cooling the film before relaxing the orientation tensions. Of course, it is to be understood that the above sequence of steps need not necessarily be followed just as indicated to establish an adequate thermoplastic material for further treatment in accord with the principles of the present invention, and that it is only set forth as a representative process for pretreating the material to place it in condition for such additional treatment.

In such further treatment, according to the present invention and discussed in more detail hereinafter, it has been found that certain heating and cooling steps produce the desired elastic qualities in properly pretreated thermoplastic film materials, as discussed previously. Thus, it has been found that an additional application of heat to the pretreated film materials should be under pressure and should be generally of a quantity sufficient enough to relieve orientation stresses in the film and less than that required to make the film molten. Immediately after the proper quantity of heat is applied, it also has been found that it is important to remove the pressure so as to permit the further treated film to cool without being under pressure. The amount of heat used in a given application is directly related to the period of that application, as will be illustrated hereinafter in specific examples.

For instance, heat was applied less than one second, followed by an immediate release of the application of heat and any pressure. This resulted in a heat shrunk spot or area which when so treated, instead of being non-flexible at its shrunk area, became elastic almost to the degree common with natural rubbers and the like. However, it is to be noted that the relation between heat sealing and shrink temperatures varies considerably for different thermoplastics such that the proper elastic heat shrink might be obtainable in other thermoplastic films at, or even above their heat seal temperatures, depending also on the period of heat application. It is further noted that the period of heat application can vary as does the thickness of the film concerned, thicker films requiring a greater period to achieve elastic heat shrinkage. It can be readily seen that numerous applications of so treated film materials can be had in such items as infants' garments, shower caps, sleeves for wet compresses, bowl covers, rain jackets, basket liners, boots, counter top dust protectors, etc. where the protecting film material requires an elastic character around a portion thereof. Illustrative examples will be described hereinafter in more detail.

Most of the testing done has been with ethylene polymers, that is, thermoplastic films including polyethylene or a copolymer of 50 percent or more ethylene. For example, a blown, extruded, irradiated, oriented film of polyethylene resin was used. Also used was a copolymer of ethylene and vinyl acetate, and a copolymer of ethylene and ethyl acrylate. The most extensive tests were employed using the aforementioned copolymers and it was found that they obtained an unusually high degree of elasticity when treated according to the process of the present invention. The forming of such copolymers is well known, and for a specific method of making a copolymer of ethylene reference can be had to U.S. Patent No. 2,200,429, issued May 14, 1940 to M. W. Perrin et al., and to U.S. Patent 2,953,551, issued September 20, 1960 to W. G. White. Of course, it is understood that after the copolymer is so formed and made into a film (by any well known process such as described for example in U.S. Patent 2,941,254, issued June 2, 1960 to I. Swerlick) it should be pretreated by a process similar to that described in aforementioned co-pending Belgian Patent 575,277, or British Patent 866,820, to provide proper orientation in the resulting film.

The following examples of the application of the novel process of the present invention upon the polymers and copolymers discussed in the previous paragraph are for purposes of illustration only, it being understood that other thermoplastic materials having similar characteristics can be treated by the novel process of the invention, and presumably, with like results. Accordingly, it is understood that the invention is not to be limited by the specific examples described hereinafter.

*Example I*

A blown, extruded, irradiated, oriented film produced from polyethylene was used in a sheet form. The polyethylene had a melt index of 2.0 and a density of 0.916 and was manufactured in a dual catalyzed process to yield a high impact polymer. This polymer contained no additives, and was not compounded.

An impulse heat sealer such as the type manufactured by Vertrod of Brooklyn, New York, or by Mercury of Milwaukee, Wisconsin, was used with moveable and stationary heated jaws. The powerstat was set to give a temperature of approxiamtely 300° F. and the jaw gauge pressure was taken at 15 p.s.i. The film was placed between the jaws and clamped for a period of 0.25 second after which the clamp pressure between the jaws was immediately released. Thus, contrary to the process used in heat sealing, the thermoplastic material was not allowed to cool off under pressure after heated. The treated part of the film was found to have shrunk approximately 46 percent in its machine direction and 23 percent in its transverse direction. It was found that shorter heat times and lower power settings resulted in less shrinkage and elasticity while longer heat times and higher power settings resulted in excessive shrinkage and more melting through of the plastic material.

Where the polyethylene film was contacted by the impulse heat sealer, an elastic integral heat shrunk band was formed into the sheet. The particular impulse sealer used was a ⅛ × .02 Nichrome straight heating wire so that the elastic band formed was relatively thin. Of course, it is understood that a heating wire can be of different configurations such as rectangular or circular, for example, or that any one of a number of other heating units can be used.

It appears that for the desired elastic quality the clamp pressure must be immediately released after heating the film for a short period, generally under one second, depending on the quantity of heat applied (which can exceed melting temperatures of film if period of application is short enough), the shrinkage taking place while the film is still heated. It is believed that the shrinkage causes release of orientation stresses with the result that an elastic relationship is set up between the remaining unshrunk part of the film and the shrunk, relatively unoriented part of the film.

*Example II*

A film of a copolymer of ethylene and vinyl acetate was blown, extruded, irradiated, and oriented in a manner similar to that described in Example I. This particular copolymer was comprised of approximately 86.4 percent ethylene and 13.6 percent vinyl acetate, the copolymer having a melt index of 2.5.

This film was treated by using an impulse heat sealer substantially as described in Example I, with satisfactory results being obtained. The treated part of the film was found to have shrunk approximately 50 percent in its machine direction and 20 percent in its transverse direction.

*Example III*

A film of a copolymer of ethylene and ethyl acrylate was manufactured comprising 80 percent ethylene and 20 percent ethyl acrylate, the copolymer having a melt index of 2.0 to 3.0 and a density of 0.928.

Again this copolymer was treated substantially as was the polyethylene film of Example I achieving satisfactory results. The treated part of the film was found to have shrunk 46 percent in its machine direction and 25 percent in its transverse direction.

Repeated stretching tests were run on the samples of Examples I–II and it was found that they retained their elastomeric properties to the degree of from zero to 15 percent of that originally exhibited before the repeated series of stretchings were made.

As stated previously, numerous products can be made by the novel process of the present invention, particularly where inexpensive disposable items are desired and an elastic character within the article is necessary. Such plastics as set forth in the specific examples above have a high degree of moisture resistance, are lightweight, are relatively inexpensive and are easily formable and otherwise flexible. They find many uses. Some such specific uses are illustrated in the drawing, it being understood that the numerous illustrations are representative only of the almost infinite number of applications where such materials can be effectively employed by using the present invention.

Referring more particularly to FIGURES 1 to 5, there is illustrated an infant's undergarment 10 made solely of one of the aforementioned thermoplastic materials. The undergarment 10 includes an upper waist opening 12 and lower leg openings 14. Closely adjacent to the upper opening and around the entire body of the undergarment 10 is located an elastic or integral stretch band area 16 with a similar band area 18 being located closely adjacent to the periphery of the leg openings 14. The garment also includes side portions 20 and a crotch portion 22.

FIGURES 1 and 2 illustrate a sheet blank 24 from which the material for an undergarment 10 is to be formed. The blank 24 is folded upon itself, as illustrated in FIGURE 2, so as to include a fold line 26 which corresponds at least partially to the crotch portion 22 of the garment 10. By a cutting operation portions 28 are removed from the blank 24 so as to form leg openings 14 and crotch 22.

The opposite sides of the blank 24 are secured together by heat sealing along edges 30 of that blank to form the enclosed sides 20 of the undergarment 10. This heat sealing can be accomplished by any well known method, such as by employing an impulse type sealer as described previously only increasing the amount of heat applied, applying that heat for a longer period of time, and permitting the adjoining sides of the blank 24 to cool under pressure.

Once the garment is completed up to this point the integral stretch band areas 16 and 18 are formed adjacent the openings 12 and 14 of the undergarment 10, as illustrated in FIGURE 5, by the application of heat for an instant under pressure as described in Example I. There is only the qualification that because two plies of film are involved it is desirable to apply an insert 32 in the openings 12 and 14 between the plies of material to prevent their sticking together during the application of heat. The inserts 32 can be formed of flexible paper, asbestos, polytetrafluoroethylene coated glass cloth, or any other similar material. It is generally desirable that the flexible inserts 32 be non-adhering such as wax-paper, so as not to stick to the plastic film. After the integral stretch band areas 16 and 18 are formed into the plastic material, inserts 32 are removed and the article or garment is ready for use. Instead of inserts 32 it is also conceivable that dusting between the film plies, with starch dust or the like, would prevent adhesion therebetween when heat treating the film. If desired, the undergarment 10 can be made 10 to 20 percent oversize since the elastic band areas 16 and 18 will heat shrink to such an extent that the garment will fit properly.

FIGURES 3 and 4 are illustrations of another method of making an infant's undergarment 10 out of tubular stock or blank 34, only in a progressive, sequential manner. In using tubular film stock or blank 34, the sides 20 of the garment are already formed, the tubular stock being flattened into a 2-ply member for processing. In forming the garment 10, the blank 34 is cut along the lines 36 and 38 to form the entire cut out for the garment 10. The garment 10 is then heat-sealed at the crotch 22 in a manner similar to that described for the sides 30 of the blank 24. The elastic band areas 16 and 18 are then formed in the cut out garment 10 in the manner described previously with the blank 24. It is to be understood, however, that with any of the blanks above described, as for example the blank 34, the operations of cutting the portions, heat sealing, and heat shrinking can all occur substantially simultaneously as desired, and particularly if automatic or semi-automatic machine elements (not shown) are used. Such operations can be accomplished on a continuous roll of stock in a sequential manner if desired. The particular machinery or other apparatus for accomplishing such a simultaneous and sequential operation do not form a part of the present invention.

Referring more particularly to FIGURES 6 to 8, there is illustrated a modified form of infant's garment 40 including an inverted V-crotch 42, leg openings 44, upper waist opening 46, and sides 48. Also included is an integral stretch band 50 adjacent the openings 44 and extending completely therearound and a series of in line elastic band areas 52 formed adjacent and partially around the waist opening 46. One method of forming the undergarment 40 is by using an elongated tubular blank 54 of the proper thermoplastic material similar to the blank 34 of FIGURES 3 and 4. The difference here, however, is in the cut out operations performed on a blank material.

Accordingly, the blank 54 is cut along line 56 and along lines 58 to form the upper opening 46, the leg openings 44 and the shape of the crotch 42. Heat sealing then takes place along edges 60 in a manner similar to that applied along the edges 30 of the blank 24 in FIGURE 1. Due to the tubular shape of the blank 54, the sides 48 of the undergarment 40 need not be sealed. The elastic areas around the leg openings 44 are formed similar to the elastic area 18 in FIGURE 5, using a spacer or insert 32. The elastic area 52 along the waistline of the garment 40 is formed by only heating certain spots along the waistband so that there are elastic and non-elastic areas around the band. The elasticity of the thermoplastic material around the band to form this broken waistline is accomplished in the same manner as with an entire waistline except for the size of the areas so treated. Spotted areas of elasticity, such as of the areas 52, are particularly useful when the amount of elasticity in the garment is desired to be less than that present when the band is substantially continuous around the entire waistline.

As a further illustration another article of apparel which can be made by the process of the present invention is shown in FIGURES 9 and 10. The article represents a shower cap 62 having a bottom open periphery 64 and an elastic band 66 formed integrally therearound. It also, of course, can be made from any thermoplastic material similar to that illustrated in Examples I to III previously discussed. It is primarily formed by taking a circular blank 68 cut from a sheet (not shown) of a thermoplastic film in any convenient manner. An impulse heat element is placed around the blank 68 closely adjacent its circumferential edge in a manner similar to that employed in the aforesaid examples. The application of the heat causes the periphery 64 to come in together due to the heat shrinking in the band 66. This results in a cup shaped body forming the cap 62. It is to be understood that the band 66 can also be intermittent, as illustrated in the waistline of the garment 40 previously descirbed. It is also understood that other similar articles as the shower cap, such as table covers and the like, can be formed in a similar manner.

Yet another article which can be made by utilizing the principles of the present invention is illustrated in FIGURES 11 to 13. This article can be described as a sleeve 70 having opposite open ends 72 and integral stretch bands 74 immediately adjacent the openings 72. Such a sleeve can have many uses such as for holding wet compresses in position. The sleeve 70 is, of course, made of the proper thermoplastic material discussed previously in regard to other embodiments and the elastic areas 74 are formed in a manner similar to the band areas 16 and 18 of FIGURE 5 for example. The body of the sleeve 70 can be made from a blank 76 of tubular stock, such stock, except for its size, being similar to that illustrated in FIGURES 3 and 4, for example. The stock is cut transversely along lines 78 so as to present a sleeve of desirable length. It is noted that no heat sealing is necessary in forming the sleeve 70 from a blank such as 76.

There is illustrated in FIGURES 14 to 17 a somewhat different embodiment of the principles of the present invention than that shown hereinbefore. This is related to a tape 80 of elastic material, the tape 80 being formed entirely of one of the above-discussed thermoplastic materials and being wound in a roll stock 82 as is quite common for tape-like articles. The tape 80 can be formed in preelasticized sections 84 including an elastic band area 86 located generally centrally therein with a perforation line 88 for tearing of a section 84 from the roll 82. The elasticized center band area 86 can be area shrunk and elasticized by the process of this invention as discussed in the aforesaid Examples. The section 84 includes end portions 90 which can be used to attach the section 84 to another plastic article, such as a mitten 92, in a manner similar to that described in U.S. Patent 2,884,643 issued to J. Winson and dated May 5, 1959. Briefly, the natural adhesive quality of thermoplastic end portions 90 and the thermoplastic portion of a mitten 92 adapt them for a heat seal as is well known in the art and taught by aforementioned Patent 2,884,643.

While certain representative embodiments and details have been shown for the purpose of illustrating the invention, it will be apparent to those skilled in the art that various changes and modifications can be made therein without departing from the spirit and scope of the invention.

Accordingly, what is claimed as new is:

1. A disposable garment having a sleeve-like body portion and openings therein for human limb members, said body portion comprising oriented thermoplastic film, the film area adjacent each said opening comprising an integral stretch band extending about each opening's periphery.

2. A disposable garment consisting of an oriented film defining a covering for a portion of the human body, said covering including openings for portions of the body to extend therethrough, the film area adjacent at least one of said openings comprising an integral stretch band extending about said opening's periphery.

3. A disposable garment consisting of an oriented thermoplastic film defining a covering for a portion of the human body, said covering including a waist opening and generally opposite limb openings, the film area adjacent each said opening comprising an integral stretch band extending about each opening's periphery.

References Cited by the Examiner
UNITED STATES PATENTS

| | | | |
|---|---|---|---|
| 1,458,732 | 6/1923 | Sloper | 156—84 |
| 1,983,870 | 12/1934 | Ostwald | 154 |
| 2,027,962 | 1/1936 | Currie | 154 |
| 2,474,375 | 6/1949 | Shearer et al. | 154 |
| 2,690,785 | 10/1954 | McWilliams | 156—84 |
| 2,748,048 | 5/1956 | Russell | 156—289 X |
| 2,786,792 | 3/1957 | Mikiska | 156—289 X |
| 2,880,727 | 4/1959 | Whalen | 128—288 |
| 2,905,581 | 9/1959 | Maxey | 128—288 X |
| 2,928,132 | 3/1960 | Richards. | |
| 2,954,770 | 10/1960 | Roth | 128—288 |
| 2,976,199 | 3/1961 | Rand. | |
| 2,976,655 | 3/1961 | Dreyfus et al. | 53—42 |
| 3,081,571 | 3/1963 | Dayen et al. | 156—84 X |

ADELE M. EAGER, *Primary Examiner.*

EARL M. BERGERT, *Examiner.*